(12) United States Patent
Pinsker

(10) Patent No.: US 6,708,679 B1
(45) Date of Patent: Mar. 23, 2004

(54) POLUTION CONTROL KIT

(76) Inventor: Mike Pinsker, 1369 Home Ave., Fortuna, CA (US) 95540

( * ) Notice: Subject to any disclaimer, the term of this patent is extended or adjusted under 35 U.S.C. 154(b) by 0 days.

(21) Appl. No.: 10/313,025

(22) Filed: Dec. 6, 2002

(51) Int. Cl.[7] .................................................. F02B 25/06
(52) U.S. Cl. ..................................................... 123/572
(58) Field of Search ............................... 123/572, 573, 123/574

(56) References Cited

U.S. PATENT DOCUMENTS

| | | | | |
|---|---|---|---|---|
| 3,884,201 A | | 5/1975 | Cregan | |
| 3,946,710 A | * | 3/1976 | Albano et al. | 123/572 |
| 4,090,477 A | * | 5/1978 | Gockel | 123/572 |
| 4,715,351 A | * | 12/1987 | Pankow | 123/572 |
| 4,852,539 A | | 8/1989 | Pankow | |
| 5,046,475 A | | 9/1991 | Thompson | |
| 6,003,501 A | | 12/1999 | Shimazaki et al. | |

* cited by examiner

Primary Examiner—Marguerite McMahon
(74) Attorney, Agent, or Firm—Patent & Trademark Services INC; Thomas Zack; Joseph H. McGlynn

(57) ABSTRACT

A polution control device consisting of a kit with an emission plate placed between the carburetor or fuel mixture control assembly and the engine air intake manifold. The emission plate is directly connected to the engine PCV valve to receive unburned gases.

6 Claims, 1 Drawing Sheet

POLUTION CONTROL KIT

BACKGROUND OF THE INVENTION

This invention relates in general to a polution control kit, and in particular to a polution control kit for a marine engine.

It is not usual for a fuel burning engine to have incomplete fuel combustion resulting in unwanted polution being released into the air. In some situations, like in marine engines, the problems are particularly acute. USCG (United States Coast Guard) specifications for marine engines reduce polution emissions by promoting better air to fuel ratios from the engine. A PCV valve is usually used in marine engines due to their more severe compliance requirements. Any polution control device for such engines must not disrupt the normal functions of the fuel system and they must also take into consideration relevant USCG specifications.

Crankcase gases from the after burned fuel must also be addressed. Added cost and the risk of affecting engine performance are two of the main reasons the marine engine has resisted polution controls.

DESCRIPTION OF THE PRIOR ART

Polution controls for fuel burning engines are known in the prior art. For example, U.S. Pat. No. 3,884,201 to Cregan discloses a marine engine having positive crank case ventilation provided by the eductive action of air entering a downdraft carburetor.

U.S. Pat. No. 4,852,539 to Pankow discloses an air metering valve connectable to the PCV system having a shiftable valving member which regulates the quantity of supplemental air introduced into the PCV return.

U.S. Pat. No. 5,046,475 to Thompson discloses a kit installed between a carburetor and the intake manifold of an engine to connect with the air filter to reduce polution.

U.S. Pat. No. 6,003,501 to Shimazaki et al. discloses an upwardly extending breathing chamber which communicates with an induction system via a PCV passage for returning blow-by gas to the intake manifold.

In the present invention a polution control device comprises a kit placed between the carburetor and the air inlet of the engine manifold to connect a PCV valve and reduce polution. When operative, the control device draws out unburned gases from the engine crankcase, all as will be detailed in the specification that follows hereafter.

SUMMARY OF THE INVENTION

This invention relates to a polution control device comprising a kit with an emission plate that is placed between the carburetor or fuel mixture control assembly and the engine air intake manifold of a marine engine. The emission plate is directly connected to the engine PCV valve to receive unburned gases.

It is the primary object of the present invention to provide for an improved polution control device for a fuel burning engine, especially a marine engine.

Another object is to provide for an improved polution control device for a marine engine placed between the fuel mixture control assembly and the intake manifold PCV valve.

Another object is to provide for an improved polution control device for a marine engine which can be retrofitted to an existing engine.

These and other objects and advantages of the present invention will become apparent to readers from a consideration of the ensuing description and the accompanying drawings.

DESCRIPTION OF THE PREFERRED EMBODIMENT

Figure 1:
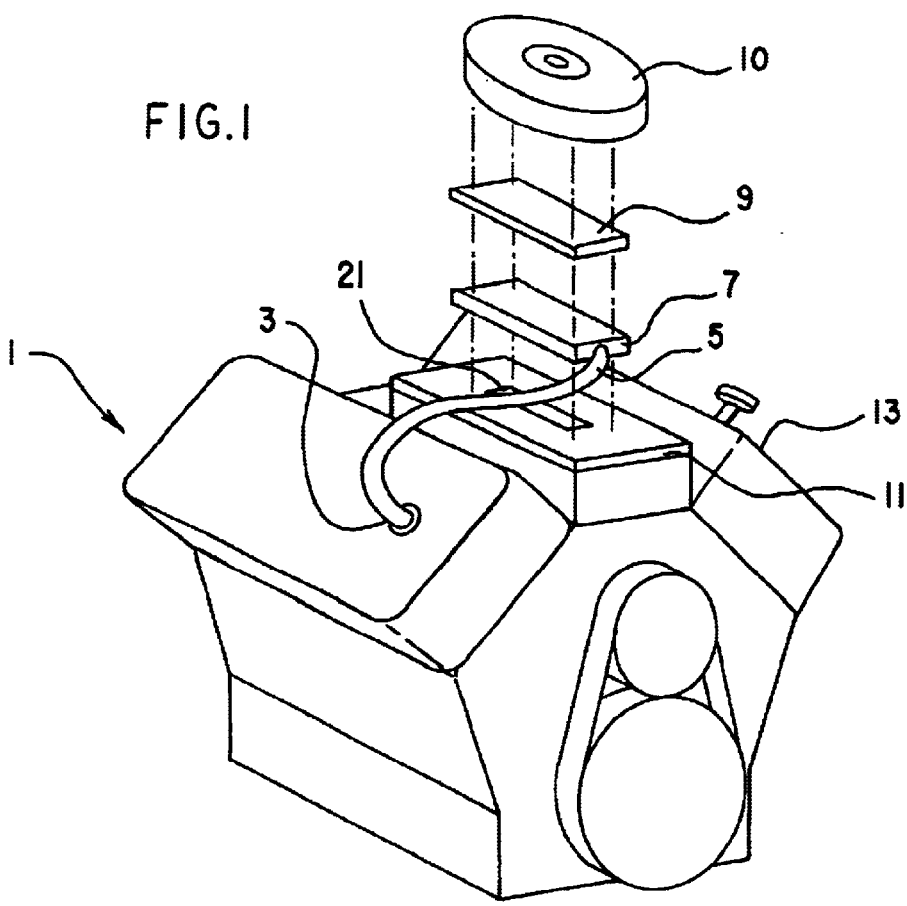
FIG. 1 is an exploded perspective view of the present invention on a conventional marine engine.

FIG. 1 is a perspective view of the present invention on a conventional marine engine 1. The engine 1 is a marine internal combustion engine which burns fuel such as gasoline or diesel oil. A PCV valve 3 is connected to a line 5 (see also FIG. 2) which is then connected by a fitting to the emission plate 7. Above the plate 7 is an air/fuel mixture control assembly or a carburetor 9. Above the carburetor 9 is the conventional air filter 10. Below the plate 7 is the air inlet manifold 11 for the engine 1. A special valve cover 13 for the inlet breather is also shown. Elements such as the carburetor 9, air filter 10, PCV valve 3 and marine engine 1 are conventional items, therefore, no further description is necessary.

The conventional PCV valve operates on a vacuum to pull unburned exhaust engine gases back into the engine for further burning in order to reduce emissions. Usually the PCV valve and hoses connected thereto are routed from the valve cover to secondary sides of a carburetor, or they may be placed in between primary and secondary throttle plates. Almost never are the PCV valves connected to the primary side of such plates.

In the present invention, the newly introduced emission plate 7 has the outlet of the PCV vacuum line 5 placed at one end of the plate 7 to provide for a lean fuel mixture at low to mid engine operating range. This range is under the plane speeds for the marine vessel. Further, by placing the emission plate 7 at a height above the air intake manifold 11 for the engine there is a better distribution of air/fuel and greater engine operating efficiency. Since, the PVC valve 3 is designed to run on a vacuum, it pulls unburned crankcase exhaust gases back into the intake manifold 11 for re-burning, instead of exhausting the gases out as pollutants into the atmosphere.

As the engine operates, the special valve cover 13 for the inlet breather, located adjacent the PCV inlet on the manifold 11, allows the engine 1 to breathe in fresh air. The net operating result is a reduction of crankcase exhaust gases, a slight increase in engine horsepower gain and the more complete combustion of the fuel being burned.

It is estimated that for marine engines, there would be approximately a 40 percent reduction in unburned hydrocarbons gas emissions. By removing crankcase gases the present invention also reduces the possibility of an engine backfire. Engines in operation at any elevation, especially altitudes in excess of five thousand feet, where ultra rich fuel mixtures are present, benefit from the device by countering the reduction of oxygen in the atmosphere by leaning the fuel mixture forcing better air fuel ratio. Further benefits of the present invention include extending engine life, saving lives that might be lost due to asphyxiation by reducing the HCO (hydrocarbon) levels (especially true for marine engine use), and the more efficient operation of the engine while saving fuel, all at the same time. These benefits are all accomplished in conformity with current USCG requirements and specification.

Figure 2:
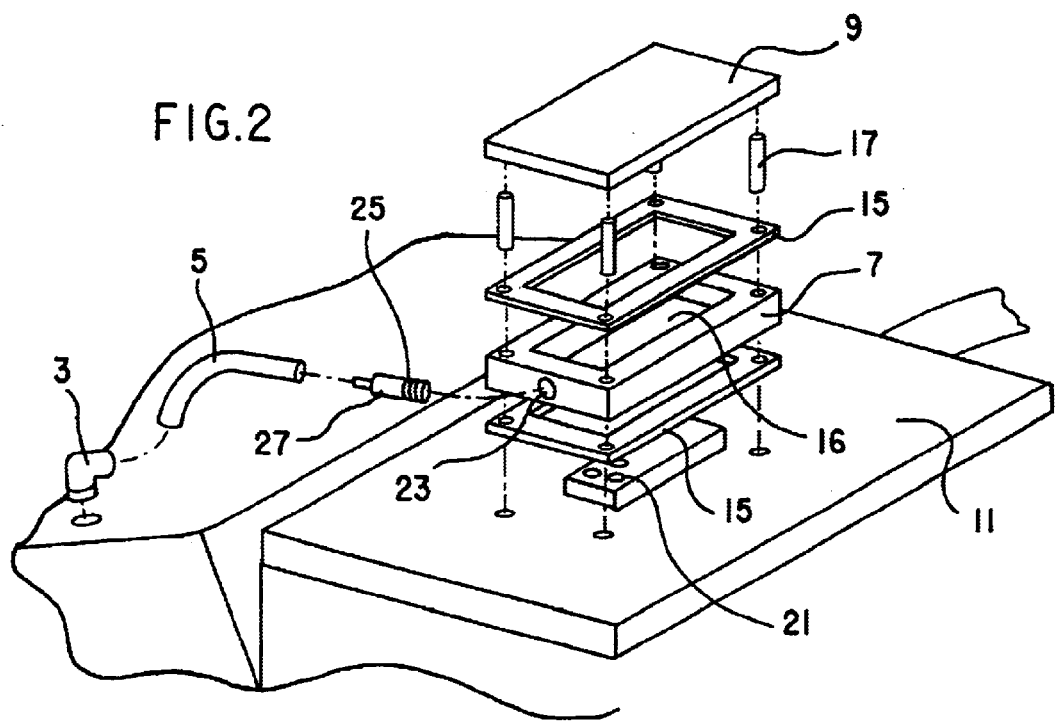
FIG. 2 is an exploded view of some of the present invention showing the emission plate, the manifold and related components.

FIG. 2 is a partial exploded view of FIG. 1 showing the emission plate 7, the air manifold 11 and related components. The plate 7 is generally rectangular with a height appreciably less than either the width or length of the plate. Two sealing gaskets 15, one below and one above the plate 7, are used to seal the escape of gases. The flow of gases is directed to the center opening 16 of the plate 7, which is sandwiched by the gaskets 15. Four mounting studs 17 are inserted into holes 19 in plate 7, and are located near the corners of the plate to secure the plate to the air manifold 11 in any conventional manner. Air inlet holes 21, in the manifold, permit gases to be reintroduced back into the combustion chamber of engine 1.

An opening 23 is provided in one end of plate 7 and is with internal threads. External threads 25, on one end of hose fitting 27, engage the threads 23 to secure the fitting 27 to the plate 7. The other end of hose fitting 27 receives the hose line 5 which connects to the PCV valve 3. This arrangement provides for a flow path for exhaust gases going from the PCV valve 3, through hose 5, through the hose fitting 27, and then through plate 7, into hole 16 and then into holes 21 in the air inlet manifold 11.

Above plate 7 is the conventional carburetor 9 (shown schematically) in FIGS. 1 and 2. The upper air filter 10 is not shown in FIG. 2, but is shown in FIG. 1. Exhaust gases, received from the combustion chamber of the engine 1, are sent by vacuum action through hose line 5, to plate 7. From plate 7, the gases are reintroduced back into the holes 21 in the air inlet manifold 11 for additional burning by the engine.

The present invention is directed mainly to polution control for marine engines, although other engines may use the same principles. The polution control device consists of a kit with the emission plate 7, the hose line 5, the two gaskets 15, the four mounting studs 17, and the fitting 27. The kit is used to interconnect the PCV valve 3 with the air manifold 11 and the fuel mixture control assembly, here carburetor 9. By interposing the emission plate 7 between the PCV valve and carburetor, rather than directly connecting the PCV valve to the carburetor, as is conventional, the desired results are obtained.

Routing the vacuum line into the center of the primary carburetor creates a controlled vacuum leak. The controlled leak creates a "lean burn". The term "lean burn", as used here, is the term currently used in association with superior emission control and better fuel mileage. As is well know, marine emissions are extremely difficult to control. However, it is also well known that extensive automotive emission testing of engines using marine engine equivalents has allowed testing laboratories to derive calculations showing the percentage reductions, substantiating the reduction claims for marine engines.

Although the Polution Control Kit and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A polution control kit for a marine engine, said polution control kit comprising:

a plate having a length, width, sides and a top surface and a bottom surface, said plate having an aperture extending from said top surface through said bottom surface, and said plate having a second aperture extending through one of said sides, means for securing said plate to an air inlet manifold on a marine engine, and means for sealing said plate to said air inlet manifold when said plate is secured to the air inlet manifold, and means for securing a PCV valve to said second aperture.

2. The polution control kit as claimed in claim 1, where said sealing means are secured to said top surface of said plate and to said bottom surface of said plate.

3. The polution control kit as claimed in claim 1, wherein said means for securing said plate to an air inlet manifold on a marine engine is a plurality of pins.

4. The polution control kit as claimed in claim 1, wherein said means for means for securing a PCV valve to said second aperture is a fitting having external threads on one end, and means for connecting said fitting to a PCV valve on an opposite end.

5. The polution control kit as claimed in claim 1, wherein when said polution control kit is installed it is mounted between a carburetor and said air inlet manifold on a marine engine.

6. A polution control kit for a marine engine, said polution control kit comprising:

a plate having a length, width, sides and a top surface and a bottom surface, said plate having an aperture extending from said top surface through said bottom surface, and said plate having a second aperture extending through one of said sides, means for securing said plate to an air inlet manifold on a marine engine, and means for sealing said plate to said air inlet manifold when said plate is secured to the air inlet manifold, and means for securing a PCV valve to said second aperture, and a PCV valve connected to said second aperture.

* * * * *